July 3, 1956  A. JAY  2,753,492

CONTACTOR ACTUATED BY A PHOTOELECTRIC CELL

Filed April 26, 1954  7 Sheets-Sheet 1

July 3, 1956  A. JAY  2,753,492
CONTACTOR ACTUATED BY A PHOTOELECTRIC CELL
Filed April 26, 1954  7 Sheets-Sheet 2

July 3, 1956   A. JAY   2,753,492
CONTACTOR ACTUATED BY A PHOTOELECTRIC CELL
Filed April 26, 1954   7 Sheets-Sheet 3

July 3, 1956 A. JAY 2,753,492
CONTACTOR ACTUATED BY A PHOTOELECTRIC CELL
Filed April 26, 1954 7 Sheets-Sheet 4

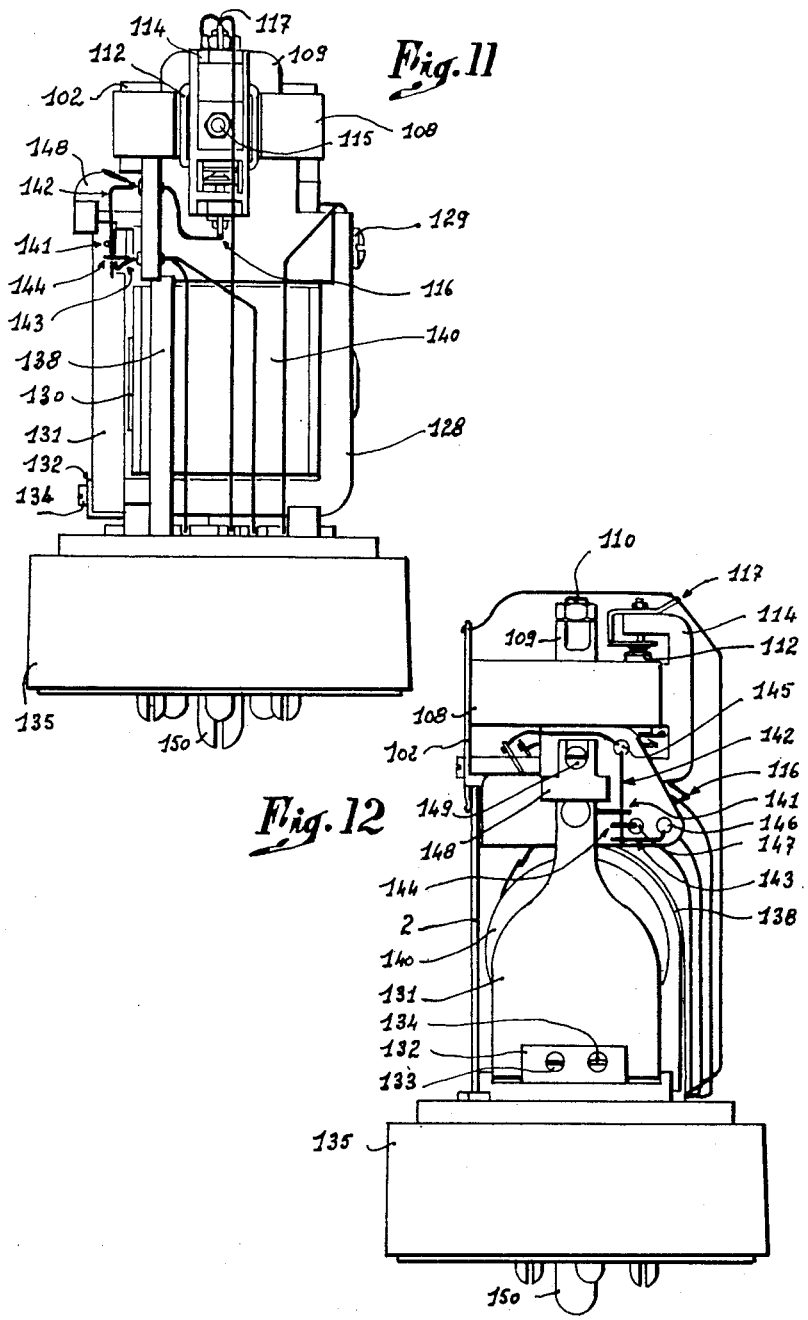

July 3, 1956  A. JAY  2,753,492
CONTACTOR ACTUATED BY A PHOTOELECTRIC CELL
Filed April 26, 1954  7 Sheets-Sheet 6

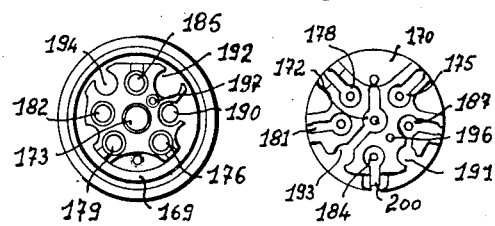
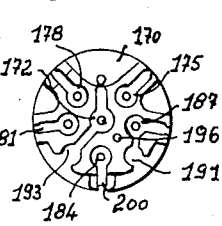
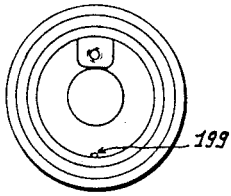
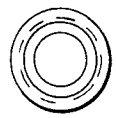
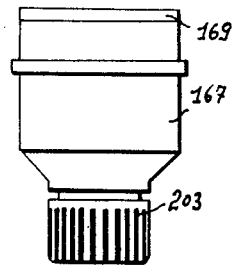
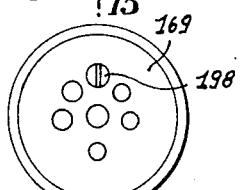
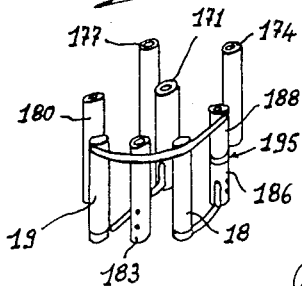
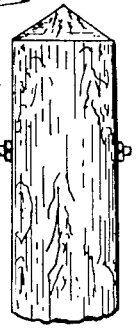
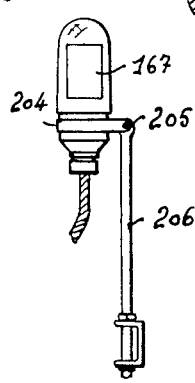

United States Patent Office 2,753,492
Patented July 3, 1956

2,753,492

CONTACTOR ACTUATED BY A PHOTO-ELECTRIC CELL

Aimé Jay, Pont-de-Claix, France, assignor to Societe Cometa, Montlfeury, France, a company of France Application April 26, 1954, Serial No. 425,637

7 Claims. (Cl. 317—124)

This invention relates to a contactor actuated by a photoelectric cell which during a very long operational life, can effect very reliably and merely when affected by light the automatic control of any sort of electrical apparatus, more particularly public or private lights.

The devices employed heretofore consisted of clocks which were actuated and released at fixed times or of the so-called astronomical clocks, the tripping and release of which vary in dependence upon the theoretical times of sunset and sunrise.

These devices have a great number of disadvantages, the main ones being: high cost of construction, especially if the clock is of the astronomical type; high cost of installation, because of the need to shelter the clock in an an enclosed space and because a lighting distribution wire is necessary, the cost of which can only be liquidated in the case of distant and dispersed lights; operational costs increased by the payment of a supervisor for re-adjusting the clocks and also, in the case of ordinary clocks, for periodic regulation in dependence upon continual variations in sunrise and sunset times.

Moreover, since clocks do not take account of metereological conditions, they must be regulated for tripping to take effect with some extent of earliness in order to compensate for dark weather. This results in current wastage in bright weather, the lights then lighting up prematurely.

Photoelectric apparatuses in combination with electro-mechanical or electronic arrangements are also used for lighting control, but these arrangements have a number of disadvantages, which are:

1. With electro-mechanical arrangements;
   a. Poor sensitivity;
   b. Sensitivity to vibrations;
   c. Costly construction
2. With electronic arrangements;
   a. High maintenance costs due to the fact that electronic valves wear out in operation;
   b. Considerable current consumption;
   c. Bulky apparatuses;
   d. Costly construction.

The contactor which is the subject of the invention consists in the use in combination of a light sensitive member such as a photo-electric cell supplying an electric current which is a function of light intensity and which acts upon a galvanometric relay, the movement of the coil of which closes the contactor circuit by means of a single pulse at each position corresponding to a maximum and minimum of light, the said relay acting as a power-amplifying member between the cell and the contactor provided with an auxiliary terminal which is the safety control member of the external circuit.

Apart from the aforementioned elements, there is also employed in combination with the said elements a current rectifier connected up in a bridge circuit arrangement, and a potential divider which can be formed, for example, by an electrical resistance.

Thus, a simple and effective means makes it possible to adjust the tripping and release sensitivity of the said contactor.

To this end, instead of having only one auxiliary terminal the electromagnetic contactor of the arrangement also comprises a reversing auxiliary terminal, the adjustment of the sensitivity of the said arrangement being controlled and set by two potentiometers which are preferably connected in series with one another and which are connected, on the one hand to the photoelectric cell and, on the other hand, to the contacts of the reversing auxiliary terminal in such manner that the cell is shunted by one potentiometer during the closure period and by the two potentiometers in series during the open period of the contactor.

This arrangement can be carried into effect by fitting the elements just described in a transparent or opaque fluid-tight box which has, however, a window to allow light to reach the cell.

In order to obtain simultaneously: a low net cost of construction, great ease of installation, very reliable operation and long operational life: the photoelectric cell, the galvanometric relay, the contactor and the rectifier are disposed in the same fluid-tight enclosure formed by a bell casing which is made of glass or any other equally fluid-tight and transparent material and which is closed at the base by a cap which is also made of glass or any other equally fluid-tight and insulating material.

The said cap comprises pins which enable the arrangement to be fitted to a stand and make the said arrangement detachable.

The potential divided may be disposed on a socket outlet type base for receiving the pins of the arrangement.

The attached diagrammatic drawings illustrate by way of example four circuit diagrams and a constructional form of the said contactor.

Figure 9:
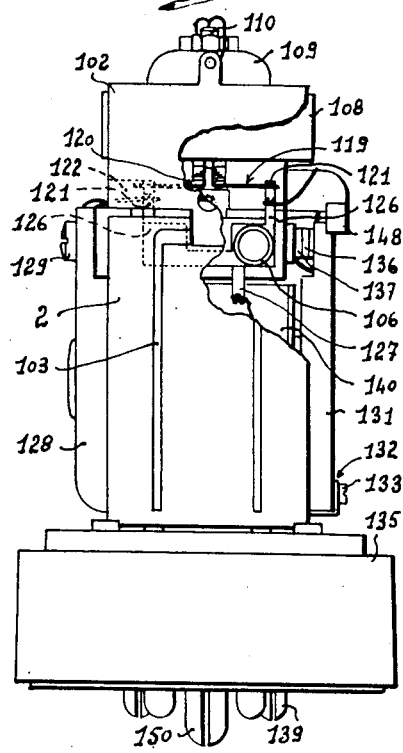
Figure 10:
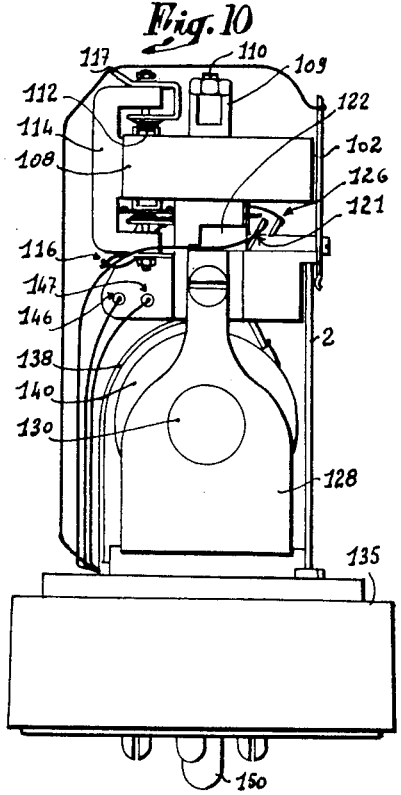
Figure 5:
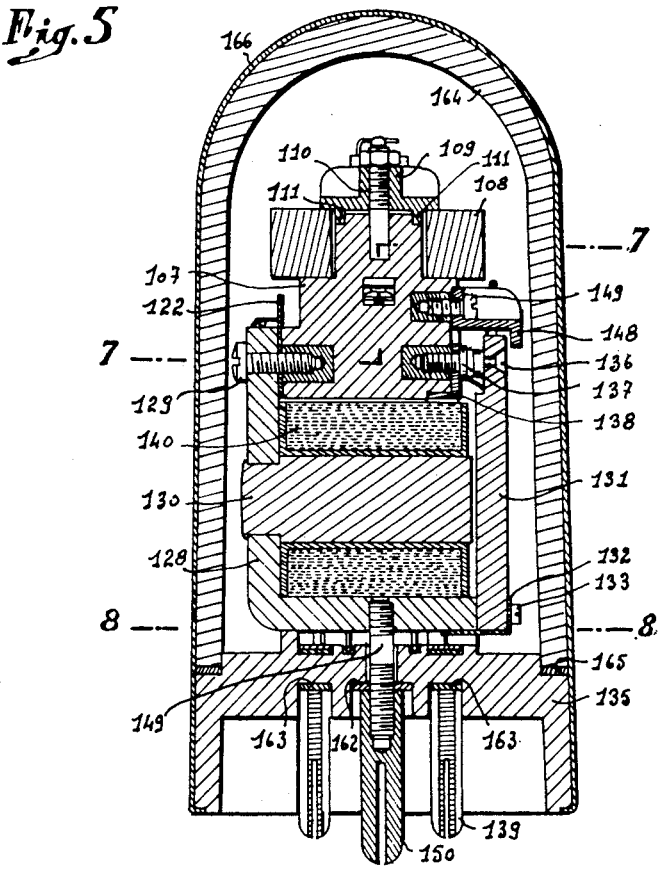
Figure 7:
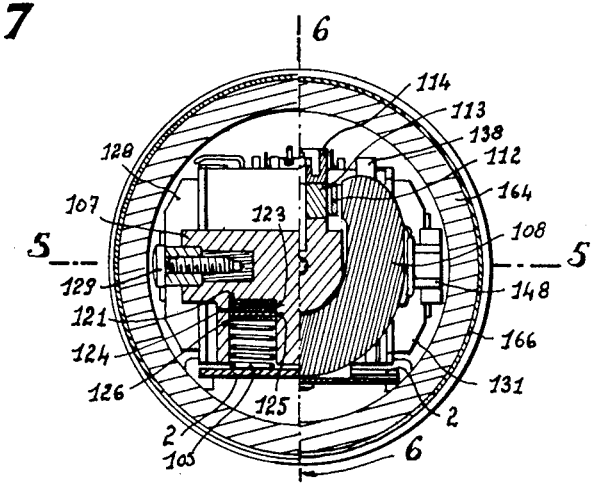
Figure 6:
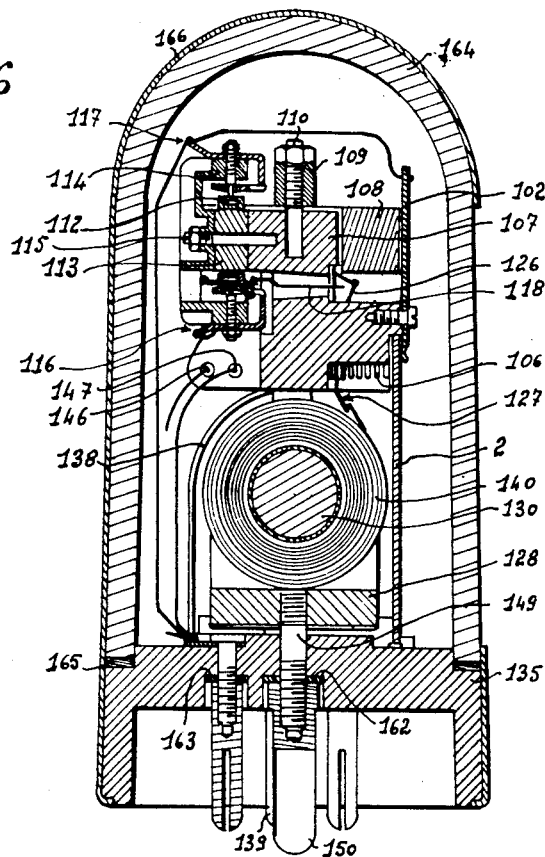
Figure 8:
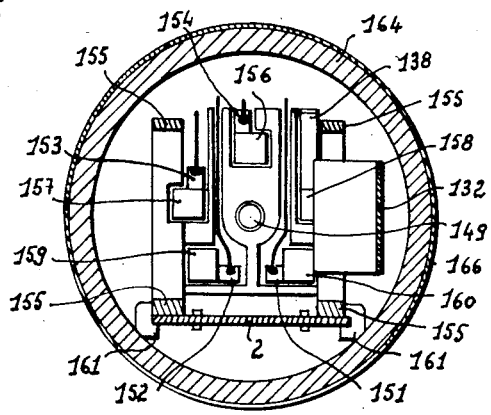
Figure 13:
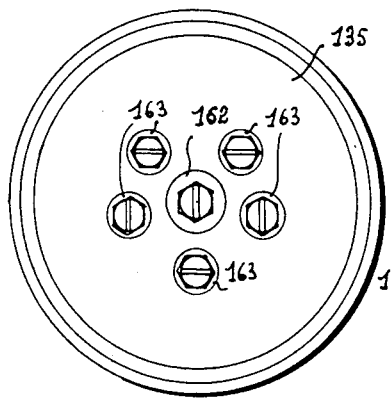
Figure 14:
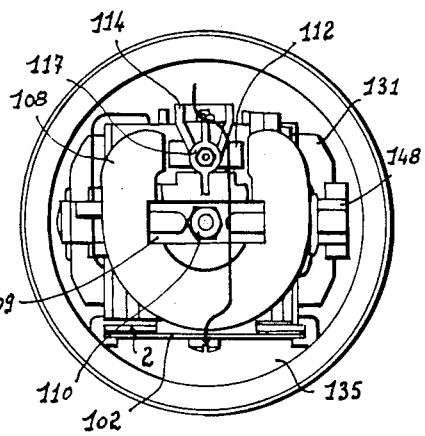
Figure 15:
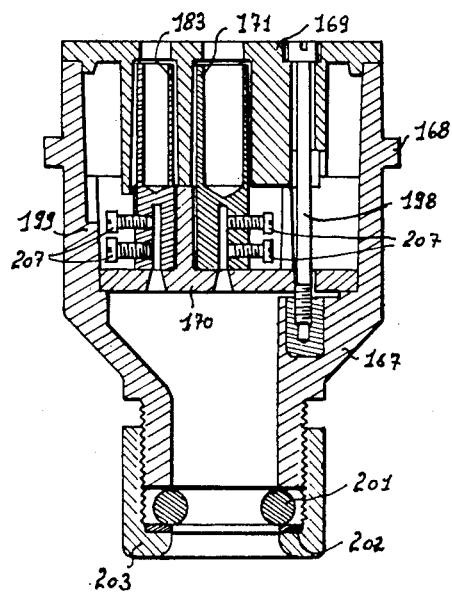

Figures 5 and 6 are longitudinal axial sections through the apparatus along the lines 5—5 and 6—6, respectively, of Figure 7;

Figures 7 and 8 are cross-sections along the lines 7—7 and 8—8, respectively, of Figure 5;

Figure 9 is an elevation in partial section of the arrangement with the protective casing removed and facing the photoelectric cell;

Figures 10 to 12 are, in relation to Figure 9, elevations of the arrangement with the casing removed and from the left-hand side, on the rear face and from the right-hand side, respectively;

Figures 13 and 14 are lower and upper plan views respectively of the arrangement with the casing removed;

Figure 15 is a vertical section through the stand along the line 15—15 of Figure 21;

Figures 16 to 19 are a plan view of the four main members forming the stand;

Figure 20 is a side elevation of the stand when fitted;

Figure 21 is a plan view of the same from the top;

Figure 22 is a perspective of the socket outlet contacts and of the resistances connected inside the stand (not shown), and Figures 23 and 24 illustrate two methods of locating the said contactor in order that it may be used.

Figure 1:
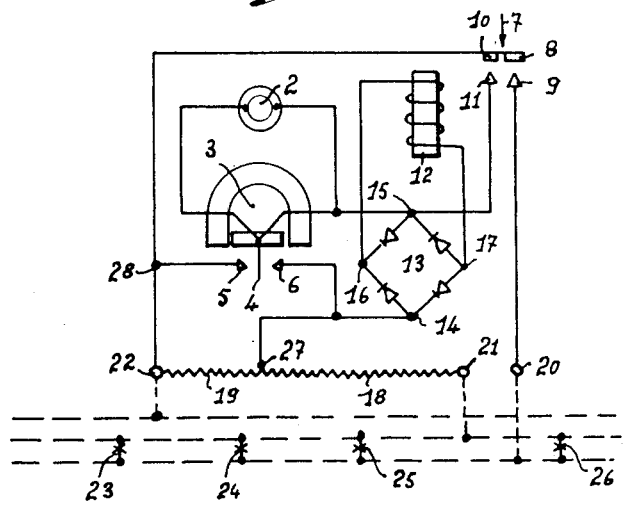
Figures 1 and 2 are circuit diagrams comprising a potential divider and an auto-transformer respectively.

In the diagram of Figure 1: 2 is a photoelectric cell of the "photopile" type; 3 is the moving coil of a galvanometric relay of the maximum and minimum type; 4 is the movable contact of 3; 5 is the minimum fixed contact, and 6 is the maximum fixed contact.

The spiral springs connected to the moving coil 3 of the galvanometric relay are so tensed as to displace the movable contact 4 against the fixed contact 5 when the coil is not energised.

The terminals of the moving coil are connected to the terminals of the cell 2 in such manner as to move the contact 4 against the fixed contact 6 when the cell 2 is illuminated.

7 is a single-pole electromagnetic contactor with an auxiliary pole, 8 and 9 are the main contacts, 10 and 11 are the auxiliary contacts, and 12 is the energising coil.

As indicated in the figure, the said contactor is so designed that the movable contacts 8 and 10 touch the fixed contacts 9 and 11 respectively when the coil 12 is energised.

13 is a rectifier having four elements, preferably of the dry type, connected in a Wheatstone bridge arrangement. The bridge is supplied with A. C. at 14 and 15 and delivers D. C. at 16 and 17.

18 and 19 are resistances forming a potential divider.

Finally, 20, 21 and 22 are the terminals for connecting the apparatus to the exterior.

The interconnections of the aforementioned elements, that is to say of 2, 3, 7, 13, 18, 19 and also of 20, 21 and 22 are effected as shown in the diagram.

The broken lines of Figure 1 show by way of example a method of connecting the arrangement when the latter is applied to the control of illumination lamps 23, 24, 25 and 26.

The operation of this arrangement is as follows:

The arrangement is supplied with mains current at the terminals 21 and 22 so that a reduced voltage appears between the points 22 and 27 of the potential divider.

When, for a given light intensity acting upon the cell, the movable contact 4 of the relay 3 is located between the fixed contacts 5 and 6, the contactor 7 being open, no current originating from 27 or from 22 flows in the rectifier 13 nor energises the coil 12.

If the said light intensity decreases sufficiently, the movable contact 4 contacts and, as a result of the flow of current, sticks against the fixed contact 5. From this instant, a current starting from 27 can flow via: 27, 14, 16, 12, 17, 15, 4, 5, 28 and 22, or in another alternation, starting from 22, via 22, 28, 5, 4, 15, 16, 12, 17, 14, 27.

In both cases the coil 12 is energised and the contacts 8 and 10 contact the contacts 9 and 11 respectively.

Thereafter the contacts 5 and 4 are shunted and their action is replaced by the action of the contacts 10 and 11, the said contacts 5 and 4 also being unstuck by the effect of the shock produced by the closure of the contactor, whereupon the movable contact 4 merely rests against the fixed contact 5 without sticking again.

Simultaneously, since the contact 8 contacts the contact 9, the control circuit is closed via 22, 8, 9, 20.

If the light acting upon the cell again increases sufficiently, the movable contact 4 first leaves the fixed contact 5 without having any result, since the flow of the current for energising the coil 12 is no longer effected through the said contacts 5 and 4 but is effected via the contacts 10 and 11. The movable contact finally reaches the fixed contact 6 and in so doing shunts the rectifier bridge at 14 and 15.

This has the effect of cancelling out the voltage at the bridge terminals and of cutting off the current flowing in the coil 12 so that the contacts 8 and 10 can separate from the contacts 9 and 11.

The opening of the contactor, as in the closure operation, produces a shock which has the effect of unsticking the contacts 4 and 6, whereafter they merely rest against one another.

Thereafter the current flowing through the contacts 4 and 6, as also the current flowing through the control circuit via 22, 8, 9 and 20, are cut off and the arrangement is ready for another cycle of operation, which will begin with the separation without result of the contacts 4 and 6 which at this moment are not passing any current.

The advantages resulting from the fact that the contacts 4 and 5 on the one hand and the contacts 4 and 6 on the other hand no longer have to pass current from the moment at which they contact one another are:

1. The avoidance of intermittent operation caused by chance vibrations to which the contacts may be subjected, for which reason the said contacts are completely insensitive to vibrations.

2. The avoidance of rupturing arcs at the moment at which the contacts separate, for which reason the contacts have a very long operational life.

3. The allowing of the said contacts to separate from one another while no potential difference exists therebetween causing electrostatic mutual attraction at the moment of separation and therefore also causing a resistance opposing the driving torque of the moving coil, for which reason high sensitivity is obtained.

The photoelectric cell 2 is preferably of the "photopile" type which has the advantage of simplicity in operation, high operational constancy in time and, in some cases, of having a spectral sensitivity substantially equal to that of the eye.

The galvanometric relay 3 is preferably as sensitive as possible. Its contacts must also be made of materials which are as far as possible good conductors and which are simultaneously refractory and unalterable by the gases filling the enclosed space within which the said contacts operate.

The movable contact 4 is preferably resiliently mounted.

The relay 3 must be so disposed as to sense adequately the opening and closure shocks of the contactor 7 and to break up the microwelds occurring between the contacts 4 and 5 on the one hand and between the contacts 4 and 6 on the other hand, while the said contacts are passing current.

The electromagnetic contactor 7, which must also be as sensitive as possible, is provided with an auxiliary pair of contacts 10 and 11 and with a pair of main contacts 8 and 9, the last-mentioned pair of contacts preferably having a high rupturing capacity.

The resistance of the coil, and therefore the supply voltage thereof, is completely arbitrary and its lower limit is merely given by reliability of current flow between the contacts 4 and 6 on the other hand, while the upper limit is given by the electrostatic attraction exerted upon the contact 4 by the contacts 5 and 6.

The contactor 7 can, if desired, be replaced by a two-pole or three-pole contactor also having an auxiliary pole for controlling two or three circuits simultaneously.

In this case, all the contacts, except one of the auxiliary contacts (the contact 10) together with one of the main contacts on the same side, must be insulated from one another.

However, in the case in which the control of a two-phase or three-phase circuit would be envisaged by means of short-circuiting the returns of the phases to the neutral, the contacts connected to the neutral point of the network could be fitted without being insulated from one another, being advantageously fitted to the movable part of the contactor.

The rectifier 13 having four elements of unidirectional conductivity which are connected in a bridge circuit arrangement is constructed to withstand the current flow and voltage required for the normal supply of the coil of the contactor 7.

The advantages resulting from the use of a rectifier connected in a bridge circuit arrangement are: (1) Rectification of the two half-cycles; (2) Avoidance of the need for the contacts 4 and 6 to pass the inductive current of the coil 12 when the said contacts 4 and 6 contact one another.

In fact the extra inductive current of the coil 12 flows via 17, 14, 16 and 17, 15, 16 and does not have to be borne by the contacts 4 and 6.

The resistances 18 and 19 are preferably of such a resistance that the no-load voltage between the points 27 and 22 is twice the sum of the voltage drops across the rectifier bridge 13 and the coil 12 for a normal supply of the latter.

This choice of voltage has the advantage of balancing the powers controlled between the contacts 4 and 5, on the one hand, and 4 and 6, on the other hand.

Figure 2:
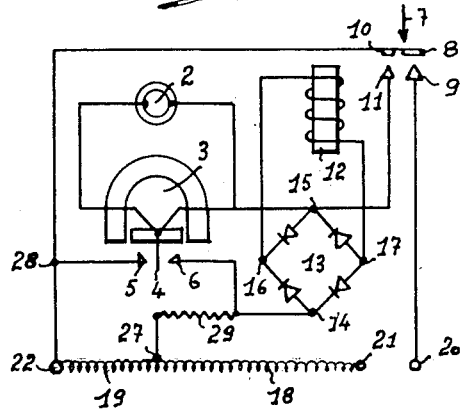

The invention is in no way limited to the method of construction which has been more particularly described because the invention seems to provide a great number of advantages, the main one being that there is practically no current consumption during daylight. On the contrary, the invention includes all variants, more particularly the variant according to the diagram as shown in Figure 2, wherein the potential divider is replaced by an autotransformer and a resistance 29.

In both cases, the operation is the same as in the case of the circuit diagram as shown in Figure 1.

The values of the resistances 18, or R1 and 19 or R2 (Figure 1) must comply with the relationship:

$$1 + \frac{R1}{R2} + \frac{R1}{R3} = \frac{U}{u1}$$

where:

U is the effective supply voltage at the terminals 21 and 22;

u1 is the effective voltage required at the terminals 14 and 15 of the rectifier bridge for a normal supply of the coil 12, and R3 is the apparent resistance of the coil 12 and of the bridge 13 measured at the terminals 14 and 15 for the same normal supply of the coil 12.

One of the two resistances 18 and 19 can be chosen arbitrarily in order to determine the other by applying the aforementioned formula.

However, if it is desired that the powers being controlled should be the same between the contacts 4 and 5, on the one hand, and between the contacts 4 and 6 on the other hand, the resistances 18 and 19 must be:

$$R1 = R3 \frac{U}{2u1}$$

and $$R2 = R3 \left( \frac{2(U - u1) - 1}{U - 2u1} \right)$$

The choice of the value of R3 and therefore of u1 is completely arbitrary within the limits already indicated for the initial arrangement which is the subject matter of Figure 1.

It will be noted in the formula just given that, if u1 is chosen equal to $$\frac{U}{2}$$

R1 will equal R3 and R2 will be infinity, that is to say that, in this case, it is permissible to embody the circuit arrangement with the single resistance 18, the resistance 19 being omitted.

If there is desired: a sensitivity below the maximum sensitivity obtained after construction, the maximum sensitivity can be reduced by means of a screen which completely covers the cell and which has a coefficient of light transmission by transparency equal to the coefficient of the reduction in sensitivity.

The same result can also be obtained by means of a mask partially covering the cell.

Figure 3:
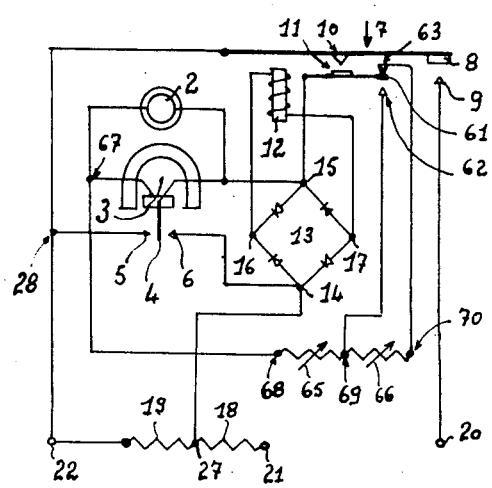
Figure 3 is the same circuit diagram with two series-connected potentiometers for adjusting the sensitivity.

It is advantageous to combine with the elements provided in the circuit diagrams of Figures 1 and 2 the following elements shown in Figure 3: a reversing auxiliary terminal, the common contact 61 of which operates at closure with the contact 62 and, at opening, with the contact 63, and an arrangement for adjusting the sensitivity, said arrangement being formed by two potentiometers 65 and 66 connected in series.

Figure 4:
Figure 4 is a variant wherein the two potentiometers are connected in parallel.

In the variant illustrated in Figure 4 of this regulating arrangement, the two potentiometers are connected in parallel.

As shown in Figure 3, the common contact 61 of the reversing auxiliary terminal is also common to the auxiliary contact 11, so that the said contacts 11 and 61 can be formed by a single strip or flexible wire.

In the case of an arrangement having connections such as those of the diagram shown in Figure 3, the operation is as follows:

If the cell 2 is insufficiently illuminated and does not energize the galvanometric relay 3 sufficiently, the movable contact 4 of the relay contacts the fixed contact 5. Thereafter the current starting from the point 27 in the potential divider flows through the bridge as it supplies the coil 12 of the contactor, actuates the latter, then passes in succession through the point 15, the contacts 4 and 5 and arrives at the terminal 22.

At the instant of tripping of the contactor 7, the contacts 4 and 5 have been shunted by the contacts 10 and 11 which are unstuck as a result of the shock caused by this tripping, after which shock the contact 4 merely rests against the contact 5 without sticking again by reason of the fact that the contacts 4 and 5 are no longer passing current. Moreover, at the closure instant of the contactor, the contact 10 bears against the flexible contact 11 which is commoned with 61, and causes 61 to contact the fixed contact 62. The cell 2 is thereafter shunted by the potentiometer 65 which is used to adjust the minimum sensitivity of the said cell, that is to say, the sensitivity which must exist at the instant of release.

When the cell is again sufficiently illuminated and the galvanometric relay 3 sufficiently energised, the movable contact 4 of the relay 3 touches the fixed contact 6. Thereafter, the current flowing in the rectifier bridge 13, and therefore in the coil 12 of the contactor 7, is shunted between the points 14 and 15, with the result that the following occurs: opening of the contactor, separation of the contacts 10 and 11, and the unsticking of the contacts 4 and 6 due to the shock produced, which contacts thereafter merely rest against one another without sticking again, by reason of the fact that they are no longer passing current, the latter having just been cut by the contacts 10 and 11.

When the contactor has been thus opened and the contact 10 has left the flexible contact 11 which is commoned with the contact 61, the latter also leaves the fixed contact 62 and bears against the fixed contact 63. The cell 2 is thereafter shunted by the two potentiometers 65 and 66 in series, the potentiometer 66 then serving to adjust maximum sensitivity of the arrangement, that is to say, the sensitivity required at the instant of renewed tripping.

The sensitivity must be at a maximum at the instant of tripping and at a minimum at the instant of release, if consecutive and temporarily incorrect trips and releases are to be avoided. This is why the potentiometers 65 and 66 are connected in series, which therefore increases the shunt resistance and hence provides improved sensitivity during the phase which corresponds to the open position of the contactor, that is to say, while the light is having its maximum effect on the cell.

Similarly, during the closure position of the contactor, the potentiometer 65 alone shunts the cell 2 and the sensitivity thereof is therefore lower than during the preceding phase and there is no risk of tripping being initiated with the same quantity of light being absorbed by the cell.

A variant of this circuit arrangement can be formed by connecting the two potentiometers as shown in Figure 4. To effect this new step, it is sufficient to omit 65 and 66 and to connect the point 71 to 68, 72 to 69, and 73 to 70.

In this variant, the two maximum and minimum adjustments are independent of one another.

A contactor contrived according to one of the said diagrams can be constructed with any type of special or commercially available material fulfilling the specifications hereinbefore given.

The elements of this arrangement can be placed together or separately within any type of protective covering formed by: a casing, a bulb, a cartridge, a box or any other similar arrangement.

The constructional arrangement illustrated in Figures 5 and 12 and 14 consists in placing a common enclosed space: the photoelectric cell; the galvanometric relay of the maximum and minimum type; the bridge-connected rectifier; the contactor with auxiliary terminals.

According to Figures 5 to 14, the cell 2 is placed vertically so as to bear against, on the one hand, the contact member 102 which serves to draw current from the lead-out wire 103 of the photoelectric cell, and on the other hand, against the springs 105 and 106 which also serve as contact members on the rear face of the said cell. The contact member 102 is arranged to serve simultaneously as a signal plate.

The galvanometric relay is fitted to a frame 107 of insulating moulded material. The magnet 108 of the said relay is fixed to the frame by a yoke 109 and a screw or stud 110, the two projections 111 (Figure 5) can be formed on the lower part of the said magnet in order to determine its correct position and to prevent it from turning when being fitted. The moving coil 112 is maintained in the air gaps of the magnet 108 and of the core 113 by a bracket 114 which is preferably of moulded material and which may or may not be conductive, but which preferably has a coefficient of expansion substantially equal to the coefficient of expansion of the moving coil and of the pivots thereof. The said bracket 114 is fixed to the frame by a screw or stud 115.

The angular keying and the supply of the moving coil are effected by means of the tags 116 and 117. The latter is insulated from the bracket 114, if the latter is made of conductive material, by means of an insulating varnish disposed upon the faces in contact with the bracket, the screw and the clamping washer, if the latter is conductive.

The movable contact 118 and the maximum fixed contact 119 and the minimum fixed contact 120 are preferably made of rare metal.

The maximum fixed contact 119 is sweated to the tag 121 which corresponds to the point 14 in Figure 3.

The minimum fixed contact 120 is also sweated to the tag 122 which corresponds to the point 28 in Figure 3. As shown in Figure 5, the tag 122 is clamped between the frame 107 and the fixed armature 128 of the contactor by the screw 129.

The bridge-connected rectifier is formed by four rectifier tablets disposed in two housings in the frame 107. Figure 7 shows one of the said housings sectioned along the axis thereof and containing, from the bottom upwards: the tag 121 corresponding to the point 14 in Figure 3; a rectifier tablet 123; the tag 124 corresponding to the point 16 or 17 in Figure 3; another rectifier tablet 125; the tag 126 corresponding to the point 15 in Figure 3; the spring 105 compressing the tablets and the tags in order to effect satisfactory contact. The said spring also effects an electrical connection between the tag 126, corresponding to the point 15 in Figure 3, and the cell 2, and constantly urges the latter against the contact member 102; the other two rectifier tablets are symmetrically disposed as shown in Figure 9 in partial section. The last mentioned Figure reveals part of the tag 126 and also the compression spring 106. The same figure also shows in chain lines the extension of the tags 121 and 126 into the adjacent housing, and also shows the connection of the minimum fixed contact 120 to the tag 122.

In the figures, the said housings are of square cross-section but they might equally well be of round section, the tags being provided in this case on the same former.

The rectifier tablets placed in the right-hand housing, as shown in partial section in Figure 9 and as shown in section in Figure 6, are fitted exactly like the tablets at the side, that is to say from the bottom upwards: the tag 121; a rectifier tablet; the tag 127 corresponding to the point 17 or 16 in Figure 3; a rectifier tablet; the tag 126, and the spring 106, the function of which is the same as the function of the spring 105.

The electromagnetic contactor comprises an outer magnetic circuit 128 (Figures 5 and 6) which is in the form of a square and which, by means of the screw 129, supports the frame 107. 130 designates the core of the said contactor, which core can be set into the member 128 or fixed thereto by means of a screw extending along the axis of the said contactor. 131 is the moving armature of the said contactor and is returned by the leaf spring 132 which also serves as an electrical connection between the member 128 and the armature 131. Since the said spring 132 is adapted to be fixed to the said moving armature 131 by two screws 133 and 134, the said spring also makes contact with the member 128 by being clamped between the same and the cap 135. The main movable contact 136 of the said contactor can be riveted to the moving armature 131, while the main fixed contact 137 is screwed to the frame and also clamps the strap 138 which serves to provide electrical connection between the contact 137 and the outlet pin 139. The coil 140 of the contactor can be retained in position on its core by a slight adhesion of the cheek lying against the member 128.

The movable auxiliary contact 141 (Figures 11 and 12), which corresponds to the contact 10 of Figure 3, can be formed by a single length of conductive wire embedded in the moving armature 131. Upon closure, said contact 141 contacts the common auxiliary contact 142 corresponding to the contacts 11 and 61 of Figure 3. In the case of an arrangement of the variable type, the said contact 142 contacts in its turn the regulation contact 143 corresponding to the contact 62 (Figure 3). Upon opening, the said contact 142 rests against the regulation contact 144 corresponding to the contact 63 of Figure 3. The contacts 142, 143, 144 can be sweated into metal eyelets 145, 146 and 147 respectively which are themselves fixed to a projecting part of the frame provided for this purpose.

Upon opening, the travel of the moving armature 131 is limited by the stop 148 which is fixed to the frame by a screw 149 (Figure 5) or by any other means.

The cap 135 supports the assembly hereinbefore described and also supports the outlet pins.

The contactor is fixed to the said cap by means of the threaded rod 149 which is screwed on the one hand into the member 128 and on the other hand into the central pin 150.

The cap 135 is bell-shaped so as to box and cover the stand (Figure 20) on which the said cap is placed. This arrangement protects the terminals against inclemencies of the weather.

Figure 8 clearly shows the manner in which the screws are disposed which serve to fix the peripheral terminals and effect electrical contact between the said peripheral terminals and the tags 151, 152, 153 and 154 and also the strap 138.

As shown in Figure 13, the pins have hexagonal heads in order that they may be tightened.

Figure 8 illustrates how the projections 155 fast with the cap 135 key the member 128 of the contactor and prevent the said member 128 from moving while being fixed and, if desired, thereafter. Similarly, the pin-fixing screws, the square heads of which can be seen at 156, 157, 158, 159 and 160 in Figure 8, are tailed in, as can be seen in Figures 5, 6 and 8, in order that they do not turn when the pins are being screwed. The tags 151, 152, 153 and 154, also the strip 138 are similarly treated.

Figure 8 illustrates how the projections 161 fast with the cap 135 are intended to make the cell 2 stand upright on its base.

Fluid-tightness at the pinch is effected by plastic packings 162 and 163.

In Figures 5 to 8: 164 designates a bell-shaped casing which is made of glass or any other transparent and fluid-tight material and which covers the assembly, the plastic or resilient packing 165 ensuring fluid-tightness.

The casing 164, as also the cap 135, are protected by screening 166 which is preferably metallic and which is provided with an aperture 167 (Figures 23 and 24) facing the cell in order to permit of the passage of light. Figures 5 and 6 show how the said screening is set below the cap 135. The said screening is preferably made impervious to bad weather and so polished as to reflect solar rays tending to heat up the said screening.

The order of connections to the pins, although completely arbitrary, is preferably effected in the following way.

The strap 138 connected to the pin 139 is also connected to the contact 137 corresponding to the contact 9 of Figure 3. The tag 151 is connected to the auxiliary contact 144 corresponding to the contact 63 of Figure 3. The tag 152 is connected to the auxiliary contact 143 corresponding to the contact 62 of Figure 3. The tag 153 is connected to the tag 121 corresponding to the point 14 of Figure 3. The tag 154 is connected to the tag 117 and to the contact member 102 corresponding to the point 67 of Figure 3.

The pins as also the tags 151, 152 and 154 corresponding thereto, need only be provided on a variable sensitivity arrangement.

In order that the assembly enclosed in the fluid-tight space may be preserved satisfactorily, the said space can be exhausted and then filled with a neutral or substantially neutral gas such, for example, as nitrogen, by reason of its low purchase price. In order to effect this, it is sufficient to remove one of the pins, connect the cap of the arrangement to an operative exhausting pump, and then to refill by allowing the nitrogen to flow through the same connecting pipe. When the pressure inside the bell is equal to atmospheric pressure, the pin is replaced.

At its base, the stand (Figures 15 and 20) has a stuffing-box which provides considerable latitude in tightening. The said stuffing-box is formed by four members which can be made of moulded insulating material and contains the two resistances 18 and 19 of Figure 3.

The casing 167 (Figures 15 and 18) is provided with a waist 168 enabling the said casing 167 to be mounted in a collar as shown in Figures 23 and 24, and preventing the casing 167 from slipping through the said collar.

The sockets and resistances are fitted in housings provided to this end in the members 169 and 170, the member 169 being shown in Figure 16 as seen from below and a top view of the member 170 being given in Figure 17.

Figure 22 indicates how the sockets and resistances are disposed and connected. The said sockets are intended to receive the pins of the arrangement and, in their lower part, the connecting wires which can be clamped by pointed screws 207 (Figure 15).

In Figures 16, 17 and 22, the socket 171 is located in the housing 172 of the member 170 and 173 of the member 169, the socket 174 is located in the housings 175 and 176, the socket 177 is located in the housings 178 and 179, the socket 180 is located in the housings 181 and 182, the socket 183 is located in the housings 184 and 185, the half-socket 186 is located in the housing 187, the half-socket 188 is located in the housing 190, the resistance 18 in the housings 191 and 192, and the resistance 19 in the housings 193 and 194.

As shown in Figure 22, the half-sockets 186 and 188 are separated by an insulated pad 195. The half-socket 186 corresponds to the point 21 in Figure 3, and is connected to one end of the resistance 18. The other half-socket 188, corresponding to the point 27 in Figure 3, is connected to the other end of the resistance 18 and also to one end of the resistance 19. The other end of the resistance 19 corresponds to the point 22 in Figure 3 and is connected to the socket 171.

The members 169 (Figure 16) and 170 (Figure 17) are assembled by means of a screw which extends through the hole 196 and which screws into the tapped hole 197. After the said members 169 and 170 have been connected, they are fixed in the casing 167 in which they are set by means of the screw 198. The positioning of the said members is determined by the projection 199 entering into a slot 200 on the member 170.

The stuffing-box (Figure 15) is formed by a packing 201, which is preferably of rubber and is toroidal in form and is pressed by a washer 202 and by the tapped plug 203, a separate plan view of which from the top is given in Figure 19.

The installation of the apparatus can be effected, as indicated in Figures 23 and 24, by means of a clamping collar 204 which is fixed by a bolt 205 to a rod 206 having an eye and also having one end tapped for fixing to any sort of support. This combination means that the rod can be inclined and used vertically, horizontally or in any other intermediate position in dependence upon requirements and upon the type of installation.

If desired, the sensitivity of a variable sensitivity arrangement can be adjusted by means of two potentiometers which can be placed part in a casing provided for this purpose. Connection is effected by means of three wires connected to the points 68, 69 and 70 respectively of Figure 3, on the one hand, and to the sockets 183, 174 and 177 respectively of Figure 22 on the other hand.

In the case of a non-variable arrangement, the said three sockets are omitted from the stand.

The advantages of the said contactor which derive from this constructional arrangement are: low purchase price; long operational life; great robustness; slight bulk; low weight; great ease of installation; detachability facilitating possible interchange of the apparatus; construction of the only two types of apparatus, one type being the variable sensitivity type and the other type not having variable sensitivity, the various mains voltages only being of importance insofar as the values of the resistances in the stand are concerned.

I claim:

1. A contactor system comprising a photocell subjected to the action of varying light intensities, a galvanometric relay including two stationary contact pieces and one removable contact piece controlled by said photocell and adapted to move out of an inoperative position into contacting engagement with either stationary contact piece according as to whether the illumination of the photocell is above or below a predetermined value, a controlled circuit including two wires, a voltage dividing circuit element connected through one end with one wire of the controlled circuit, means feeding electric energy into the second end of said voltage dividing circuit element, a rectifier system inserted between a point of said voltage dividing circuit element and the movable contact piece of the galvanometric relay, a branch circuit element connecting the second end of the voltage dividing circuit element with one of the stationary contact-pieces of the galvanometric relay to close a circuit over the rectifier system when the movable contact piece engages last mentioned stationary contact piece, a shunt for the rectifier system adapted to be closed when the movable contact-piece engages the other stationary contact-piece, an auxiliary relay fed by said rectifier system with both alternations of the current passing through said system, a double switch controlled by the auxiliary relay and controlling respectively the connection between the two wires of the controlled circuit and between the second, energized end of the voltage dividing circuit element and the end of the rectifier system connected with the movable contact-piece of the galvanometric relay.

2. A contactor system comprising a photocell subjected to the action of varying light intensities, a galvanometric relay including two stationary contact-pieces and one movable contact piece controlled by said photocell and adapted to move out of an inoperative position into contacting engagement with either stationary contact piece according as to whether the illumination of the photocell is about or below a predetermined value, a controlled circuit including two wires, a voltage dividing circuit element, connected through one end with one wire of the controlled circuit, means feeding electric energy into the second end of said voltage dividing circuit element, a rectifier system inserted between a point of said voltage dividing circuit element and the movable contact piece of the galvanometric relay, a branch circuit element connecting the second end of the voltage dividing circuit element with one of the stationary contact-pieces of the galvanometric relay to close a circuit over the rectifier system when the movable contact-piece engages last mentioned stationary contact-piece, a shunt for the rectifier system adapted to be closed when the movable contact-piece engages the other stationary contact-piece, an auxiliary relay fed by said rectifier system with both alternations of the current passing through said system, a double switch controlled by the auxiliary relay and controlling respectively the connection between the two wires of the controlled circuit and between the second, energized end of the voltage dividing circuit element and the end of the rectifier system connected with the movable contact piece of the galvanomertic relay, the operation of said double switch mechanically cutting out the adherence between the movable contact-piece of the galvanometric relay and the stationary contact-piece engaged thereby.

3. A contactor system comprising a photocell subjected to the action of varying light intensities, a galvanometric relay including two stationary contact-pieces and one movable contact-piece controlled by said photocell and adapted to move out of an inoperative position into contacting engagement with either stationary contact-piece according as to whether the illumination of the photocell is above or below a predetermined value, a controlled circuit including two wires, a potentiometer connected through one end with one wire of the controlled circuit, means feeding electric energy into the second end of said potentiometer, a rectifier system inserted between a tapping on said potentiometer and the movable contact-piece of the galvanometric relay, a branch circuit element connecting the second end of the potentiometer with one of the stationary contact-pieces of the galvanometric relay to close a circuit over the rectifier system when the movable contact-piece engages last mentioned stationary contact-piece, a shunt for the rectifier system adapted to be closed when the movable contact-piece engages the other stationary contact piece, an auxiliary relay fed by said rectifier system with both alternations of the current passing through said system, a double switch controlled by the auxiliary relay and controlling respectively the connection between the two wires of the controlled circuit and between the second energized end of the potentiometer and the end of the rectifier system connected with the movable contact piece of the galvanometric relay.

4. A contactor system comprising a photocell subjected to the action of varying light intensities, a galvanometric relay including two stationary contact pieces and one movable contact piece controlled by said photocell and adapted to move out of an inoperative position into contacting engagement with either stationary contact piece according as to whether the illumination of the photocell is above or below a predetermined value, a controlled circuit including two wires, a voltage dividing element connected through one end with one wire of the controlled circuit, means feeding electric energy into the second end of said voltage dividing circuit element, a rectifier system inserted between a point of said voltage dividing circuit element and the movable contact piece of the galvanometric relay, a branch circuit element connecting the second end of the voltage dividing circuit element with one of the stationary contact-pieces of the galvanometric relay to close a circuit over the rectifier system when the movable contact piece engages last mentioned stationary contact piece, a shunt for the rectifier system adapted to be closed when the movable contact piece engages the other stationary contact piece, an auxiliary relay fed by said rectifier system with both alternations of the current passing through said system, a double switch controlled by the auxiliary relay and controlling respectively the connection between the two wires of the controlled circuit and between the second energized end of the voltage dividing circuit element and the end of the rectifier system connected with the movable contact piece of the galvanometric relay, a shunt circuit inserted between the said second energized end of the voltage dividing circuit element and last mentioned end of the rectifier system and including two parallel branches and means whereby the double switch closes selectively said branches according to the position assumed by it and an adjustable resistance inserted in one of the branches.

5. A contactor system comprising a photocell subjected to the action of varying light intensities, a galvanometric relay including two stationary contact pieces and one movable piece controlled by said photocell and adapted to move out of an inoperative position into contacting engagement with either stationary contact piece according as to whether the illumination of the photocell is above or below a predetermined value, a controlled circuit including two wires, a voltage dividing circuit element connected through one end with one wire of the controlled circuit, means feeding electric energy into the second end of said voltage dividing circuit element, a rectifier system inserted between a point of said voltage dividing circuit element and the movable contact piece of the galvanometric relay, a branch circuit element connecting the second end of the voltage dividing circuit element with one of the stationary contact-pieces of the galvanometric relay to close a circuit over the rectifier system when the movable contact-piece engages last mentioned stationary contact-piece, a shunt for the rectifier system adapted to be closed when the movable contact-piece engages the other stationary contact-piece, an auxiliary relay fed by said rectifier system with both alternations of the current passing through said system, a double switch controlled by the auxiliary relay and controlling respectively the connection between the two wires of the controlled circuit and between the second energized end of the voltage dividing circuit element and the end of the rectifier system connected with the movable contact-piece of the galvanometric relay, a shunt-circuit inserted between the said second energized end of the voltage dividing circuit element and last mentioned end of the rectifier system and including two parallel branches and means selectively whereby the double switch closes selectively said branches according to the position assumed by it and an adjustable resistance inserted in the portion of the shunt circuit extending in series with the two branches and a further adjustable resistance inserted in one of the branches.

6. A contactor system comprising a photocell subjected to the action of varying light intensities, a galvanometric relay including two stationary contact-piece and one movable contact-piece controlled by said photocell and adapted to move out of an inoperative position into contacting engagement with either stationary contact piece according as to whether the illumination of the photocell is above or below a predetermined value, a controlled circuit including two wires, a voltage dividing circuit element connected through one end with one wire of the controlled circuit, means feeding electric energy into the second end of said voltage dividing circuit element, a rectifier system inserted between a point of said voltage dividing circuit element and the movable contact piece of the galvanometric relay, a branch circuit element connecting the second end of the voltage dividing circuit element with one of the stationary contact-pieces of the galvanometric relay to close a circuit over the rectifier system when the movable contact-piece engages last mentioned stationary contact-piece, a shunt for the rectifier system adapted to be closed when the movable contact-piece engages the other stationary contact-piece, an auxiliary relay fed by said rectifier system with both alternations of the current passing through said system, a double switch controlled by the auxiliary relay and controlling respectively the connection between the two wires of the controlled circuit and between the second energized end of the voltage dividing circuit element and the end of the rectifier system connected with the movable contact piece of the galvanometric relay, a shunt circuit inserted between the said second energized end of the voltage dividing circuit element and last mentioned end of the rectifier system and including two parallel branches and means whereby the double switch closes respectively said branches according to the position assumed by it and an adjustable resistance inserted in each of the branches of the shunt circuit.

7. A contactor system comprising a photocell subjected to the action of varying light intensities, a galvanometric relay including two stationary contact-pieces and one movable contact piece controlled by said photocell and adapted to move out of an inoperative position into contacting engagement with either stationary contact piece according as to whether the illumination of the photocell is above or below a predetermined value, a controlled circuit including two wires, a voltage dividing circuit element connected through one end with one wire of the controlled circuit, means feeding electric energy into the second end of said voltage dividing circuit element, a rectifier system inserted between a point of said voltage dividing circuit element and the movable contact piece of the galvanometric relay, a branch circuit element connecting the second end of the voltage dividing circuit element with one of the stationary contact-pieces of the galvanometric relay to close a circuit over the rectifier system when the movable contact piece engages last mentioned stationary contact piece, a shunt for the rectifier system adapted to be closed when the movable contact piece engages the other stationary contact piece, an auxiliary relay fed by said rectifier system with both alternations of the current passing through said system, a double switch controlled by the auxiliary relay and controlling respectively the connection between the two wires of the controlled circuit and between the second energized end of the voltage dividing circuit element and the end of the rectifier system connected with the movable contact piece of the galvanometric relay; a fluidtight casing enclosing the photocell, the galvanometric relay, the rectifier system and the double switch, provided with a gate for the passage of light towards the photocell and including a cap of fluidtight insulating material closing the lower end of the casing, pins extending through the cap and operatively connected with the cell, the galvanometric relay and the double switch and a support carrying the voltage dividing circuit element and including sockets adapted to electrically and mechanically cooperate with said pins.

References Cited in the file of this patent
UNITED STATES PATENTS

| | | |
|---|---|---|
| 1,949,689 | Lamb | Mar. 6, 1934 |
| 2,042,109 | Lamb | May 26, 1936 |
| 2,123,470 | Lamb | July 12, 1938 |
| 2,464,886 | O'Reilly | Mar. 22, 1949 |